United States Patent Office 3,428,631
Patented Feb. 18, 1969

3,428,631
BASICALLY SUBSTITUTED 1,3,4-THIADIAZINES
AND METHODS OF PREPARATION THEREOF
Donald L. Trepanier and Paul E. Krieger, Indianapolis,
Ind., assignors to The Dow Chemical Company, Midland, Mich., a corporation of Delaware
No Drawing. Filed Sept. 30, 1966, Ser. No. 583,453
U.S. Cl. 260—243                    16 Claims
Int. Cl. C07d 93/22; A61k 27/00

ABSTRACT OF THE DISCLOSURE

Substituted 5,6-dihydro- and 3,4,5,6-tetrahydro-1,3,4-thiadiazine compounds having a basic substituent in the 2 position, such as 2-amino-5,6-dihydro-4,6-dimethyl-4H-1,3,4-thiadiazine or 3,4,5,6-tetrahydro-4,6-dimethyl-2-(3-pyridyl)-1,3,4-thiadiazine, are prepared by the reaction of β-hydrazinoalkylthiols with an aldehyde, an imido ester or a nitrile. The compounds are useful as agents which are active on the central nervous system and are active in the potentiation of barbiturates such as hexobarbital, as indicated by their effectiveness in prolonging hexobarbital sleep time in mice.

---

This invention is concerned with novel basically substituted thiadiazines and salts thereof and to methods for their preparation. More particularly, this invention is directed to 1,3,4-thiadiazine compounds corresponding to the formulae:

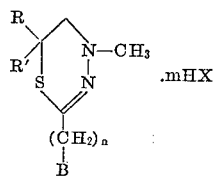

.mHX          I

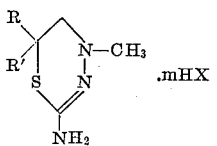

.mHX          II

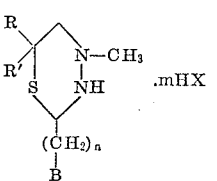

.mHX          III

In the present specification and claims, R and R' each independently represent hydrogen or a lower alkyl group having from 1 to 4 carbon atoms, inclusive, B represents a cyclic amine group having from 4 to 5 carbon atoms, HX represents hydrochloride, hydrobromide or a physiologically acceptable dicarboxylic acid having from 2 to 4 carbon atoms, n represents an integer from zero to 4 and m represents an integer from zero, to 1, to 2. The term cyclic amine group is intended to represent a ring having no more than 6 members, at least one of which is a nitrogen atom.

The novel thiadiazines are clear, colored or colorless oils which are only slightly soluble in water and which have good solubility in organic solvents, and particularly in chlorinated hydrocarbons. The thiadiazine salts, such as the hydrobromide, hydrochloride, oxalate, maleate, and succinate, for example, are crystalline solids which are soluble in water and alcohols and relatively insoluble in ether.

The thiadiazine compounds corresponding to Formula I are prepared by reacting a β-hydrazinoalkylthiol corresponding to the formula

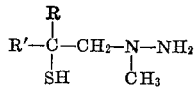

IV with an imido ester corresponding to the formula

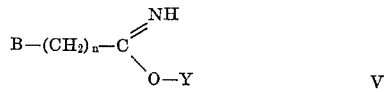

V wherein Y represents methyl, ethyl, propyl or butyl and acid addition salts thereof. Representative imido esters include methyl picolinimidate, butyl picolinimidate hydrochloride, propyl isonicotinimidate dihydrochloride, ethyl isonicotinimidate dihydrochloride and propyl 2-(1-pyrrolidinyl)acetimidate. Representative β-hydrazinoalkyl thiols include 1-(1-methylhydrazino)-2-propanethiol, 1-(1-methylhydrazino)-2-butanethiol, 1-(1-methylhydrazino)-2-methyl-2-hexanethiol, and 1-(1-methylhydrazino)-2-ethyl-2-pentanethiol. The β-hydrazinoalkyl thiols are prepared from potassium thiocyanate, methylhydrazine and an alkylene oxide as hereinafter illustrated by Example I.

The condensation reaction proceeds at temperatures from about 20° C. to the boiling point of the reaction mixture, and is preferably carried out at reflux temperatures. The exact proportions of the reactants to be employed is not critical, some of the desired product being obtained when the reactants are mixed together in any proportions. However, the reactants are consumed in subsantially equimolar proportions, and the use of the reactants in such proportions is preferred.

In the preparation of the compounds of Formula I a β-hydrazinoalkylthiol and an imido ester are combined and heated to within the reaction temperature range. In a convenient procedure, the reaction is carried out in the presence of an inert organic solvent such as methanol or ethanol. After the reaction period, the mixture is made basic by the addition of aqueous alkali metal hydroxide. The thiadiazine product can be separated from the reaction mixture by such conventional means as evaporation, extraction, and chromatography.

The compounds of Formula I wherein at least one of R and R' is hydrogen can be prepared in the free base form by the condensation of a β-hydrazine-alkyl thiol corresponding to the formula

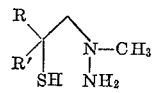

VI wherein at least R or R' is hydrogen, with a nitrile corresponding to the formula

VII

The reaction proceeds readily when the reactants are mixed together, preferably with an inert organic solvent such as methanol, ethanol, isopropanol, butanol or mixtures thereof as a reaction medium. The reaction proceeds at temperatures from about 60° to 200° C., and is preferably carried out at the boiling temperature of the reaction medium. The time required for the condensation varies, depending upon the particular materials being used, their concentration and the reaction temperature. Best results are usually obtained by reaction times of about 18 to 26 hours at reflux temperatures. Alternatively, the reaction may be carried out in two steps, including a first heating period of about 16–24 hours immediately following the mixing of the reactants, and a second heating period of about 21 hours carried out in the presence of an inert solvent and an aqueous solution of an alkali metal hydroxide such as sodium hydroxide or potassium hydroxide. The thiadiazine product can be separated from the reaction mixture by such conventional procedures as distillation and extraction. The product can be purified by such conventional procedures as distillation and chromatography.

When it is desired to prepare the acid addition salts, the thiadiazine is dissolved in an organic solvent, preferably ethanol, and treated with a solution of acid in an organic solvent. In the preparation of the hydrohalides, the thiadiazine solution is treated with an ethereal solution of hydrogen chloride or hydrogen bromide to form the salt and the reaction mixture thus formed is diluted with ether to facilitate precipitation of the salt product. In preparation of the carboxylates, the thiadiazine is dissolved in an organic solvent and treated with a hot alcoholic solution of the carboxylic acid, whereupon the salt precipitates. The salt is thereafter separated by such conventional procedures as filtration, decantation or centrifugation.

The compounds of Formula I can also be made from a β-hydroxyalkyl acid hydrazide and phosphorus pentasulfide by the general method described in our copending application, Ser. No. 394,624, filed Sept. 4, 1964.

The compounds of Formula II can be made by the reaction of a β-hydrazino-alkyl thiol corresponding to the formula

with cyanogen bromide. The reaction proceeds readily when the reactants are contacted and mixed, preferably at the boiling temperature of the reaction mixture. The reaction consumes the alkyl thiol and the cyanogen bromide in substantially equimolar amounts, and such proportions are preferred. The reaction is preferably carried out in an aqueous solvent as reaction medium. The thiadiazine products can be separated by making the reaction mixture basic by the addition of alkali metal hydroxide and extracting the product with an organic solvent, preferably a chlorinated hydrocarbon solvent. The extraction solvent can then be removed by conventional procedures such as evaporation and distillation.

The compounds corresponding to Formula III can be made by the reaction of a β-hydrazino-alkyl thiol corresponding to Formula VIII, with an aldehyde corresponding to the formula:

The reaction proceeds readily when the reactants are contacted and heated, preferably at about 70° C. The reaction is preferably carried out in the presence of an inert organic solvent such as methanol and ethanol as reaction medium, and in the presence of a small amount of pyridine. The reaction consumes the reactants in equimolar proportions and the use of the reactants in such proportions is preferred. The thiadiazine product may be separated by conventional procedures such as distillation or evaporation and may be purified by conventional procedures such as recrystallization.

The following examples illustrate the invention but are not to be construed as limiting the same.

EXAMPLE 1

1-(1-methylhydrazino)-2-propanethiol

Potassium thiocyanate (971.8 grams; 10 moles) was dissolved in 1 liter of water and propylene oxide (581 grams; 10 moles) was added dropwise over a 2 hour period. The mixture was stirred for 3 hours, after which the organic phase was separated and dried over calcium chloride. The organic phase was distilled to give 375 grams of propylene sulfide.

74 grams of propylene sulfide prepared as described above was added dropwise over a period of 10 minutes to a boiling solution of methyl hydrazine (138 grams; 3 moles) in 200 milliliters of benzene. The mixture was refluxed for 2 hours and then held at about 25° C. overnight. The mixture was then concentrated in vacuo and the residual oil distilled. The 1-(1-methylhydrazino)-2-propanethiol was collected as a colorless liquid boiling at 65°–73° C. under a pressure of 11 to 16 millimeters of mercury.

EXAMPLE 2

Methyl picolinimidate 2-cyanopyridine (26 grams; 0.25 mole) was dissolved in 225 milliliters of methanol and sodium methoxide (1.35 grams; 0.025 mole) was added to the solution. The mixture was allowed to stand overnight, after which 1.5 milliliters of glacial acetic acid was added. The resulting mixture was concentrated in vacuo and the residue distilled. The methyl picolinimidate product was collected as a fraction boiling at 103°–104° C. under a pressure of 15 millimeters of mercury. The structure of the product was confirmed by infrared spectroscopy.

EXAMPLE 3

5,6-dihydro-4,6-dimethyl-2-(2-pyridyl)-4H-1,3,4-thiodiazine 1-(1-methylhydrazino)-2-propanethiol (14.1 grams; 0.12 mole) was mixed with 75 milliliters of methanol and 4.3 grams of gaseous hydrogen chloride. To the resulting mixture a solution of methyl picolinimidate (16 grams; 0.12 mole) in 20 milliliters of methanol was added dropwise over a period of 0.5 hour. The mixture was stirred at 20°–25° C. for two hours, after which it was concentrated by evaporation in vacuo. Water was added to the residue and the mixture extracted with ether. The ether extract was washed with water, dried over magnesium sulfate and distilled in vacuo. The 5,6-dihydro-4,6-dimethyl-2-(2-pyridyl)-4H-1,3,4 - thiadiazine product was collected as a fraction boiling at 151°–163° C. under a pressure of 0.5–2.5 millimeters of mercury. The structure of the product was confirmed by both infrared spectroscopy and nuclear magnetic resonance analysis. The thiadiazine product was dissolved in ethanol and treated with ethereal hydrogen chloride until precipitation of the solid hydrochloride was complete. The 5,6-dihydro-4,6-dimethyl-2-(2-pyridyl)-4H-1,3,4 - thiadiazine hydrochloride was found to melt at 103°–104° C.

EXAMPLE 4

5,6-dihydro-4,6,6-trimethyl-2-(4-pyridyl)-4H-1,3,4-thiadiazine 1-(1-methylhydrazino)-2-methyl-2-propanethiol (18.5 grams; 0.038 mole), prepared from 2-methyl propylene oxide in substantially the same procedure as described in Example 1, was mixed with ethyl isonicotinimidate dihydrochloride (11.1 grams; 0.083 mole); prepared by a procedure similar to that described in Example 2, and 250 milliliters of absolute ethanol. The mixture was stirred and refluxed for 18 hours, after which it was cooled and poured onto crushed ice. The resulting mixture was made basic by the addition of aqueous sodium hydroxide, and the mixture extracted with chloroform. The chloroform extract was dried over magnesium sulfate and chromatographed on a 3 by 36 centimeter column containing 160 grams of alumina (Baker No. 0537) to yield 1.5 grams of 5,6 - dihydro-4,6,6-trimethyl-2-(4-pyridyl)-4H-1,3,4-thiadiazine product. The thiadiazine product was dissolved in ether and treated with ethereal hydrogen chloride until the precipitation of the hydrochloride was complete. The 5,6-dihydro-4,6,6-trimethyl-2-(4-pyridyl)-4H-

1,3,4-thiadiazine hydrochloride was recrystallized from a mixture of isopropanol and ether and found to melt at 227°–229° C. with decomposition. The product was found by analysis to have carbon, hydrogen, chlorine and nitrogen contents of 50.74, 6.39, 13.81 and 16.01 percent by weight, respectively, as compared with the theoretical contents of 51.25, 6.25, 13.75 and 16.30 percent, respectively, calculated for the named structure.

EXAMPLE 5

5,6-dihydro-4,6-dimethyl-2-(3-(1-pyrrolidinyl)propyl)- 4H-1,3,4-thiadiazine 4-(N-pyrrolidinyl)-butyronitrile (25 grams; 0.18 mole) and 1-(1-methylhydrazino) - 2 - propanethiol (22 grams; 0.18 mole) were dissolved in 200 milliliters of absolute ethanol. The mixture was heated to the boiling point and refluxed for 18 hours. The mixture was then distilled in vacuo and the product collected as a liquid boiling at 111°–116° C. under a pressure of 0.15 millimeter mercury. The 5,6-dihydro-4,6-dimethyl-2-(3-(1-pyrrolidinyl)- propyl)-4H-1,3,4-thiadiazine product was found by analysis to have carbon, hydrogen and nitrogen contents of 59.91, 9.80 and 17.62 percent, respectively, as compared with the theoretical contents of 59.71, 9.60 and 17.41 percent, respectively, calculated for the named structure.

5,6 - dihydro - 4,6 - dimethyl-2-(3-(1-pyrrolidinyl)- propyl)-4H-1,3,4-thiadiazine succinate, having a molecular weight of 359.48, is prepared by treating the above-described thiadiazine product with hot ethanolic succinic acid.

EXAMPLE 6

5,6-dihydro-4,6-dimethyl-2-(2-pyrrol-1-yl ethyl)- 4H-1,3,4-thiadiazine

N-(2-cyanoethyl)pyrrole (25 grams; 0.21 mole) and 1-(1-methylhydrazino)-2-propanethiol (25 grams; 0.21 mole) were mixed together with 200 milliliters of absolute ethanol. The resulting mixture was heated to the boiling point and refluxed for 18 hours. The mixture was then distilled in vacuo and the product collected as a liquid boiling at 132°–139° C. under a pressure of 0.5 millimeter mercury. The 5,6 - dihydro-4,6-dimethyl-2-(2-pyrrol-1-yl ethyl)-4H-1,3,4-thiadiazine product was found by analysis to have carbon, hydrogen and nitrogen contents of 59.23, 7.87 and 18.76 percent, respectively, as compared with the theoretical contents of 59.16, 7.67 and 18.82 percent, respectively, calculated for the named structure.

5,6 - dihydro - 4,6-dimethyl-2-(2-pyrrol-1-yl ethyl)-4H-1,3,4-thiadiazine hydrobromide, having a molecular weight of 304, is prepared by treating the above-described thiadiazine product with ethereal hydrogen bromide.

EXAMPLE 7

5,6-dihydro-4,6-dimethyl-2-(4-pyridyl)- 4H-1,3,4-thiadiazine 4-cyanopyridine (13.6 grams; 0.13 mole) and 1-(1-methylhydrazino)-2-propanethiol (15.7 grams; 0.13 mole) were mixed together in 250 milliliters of absolute ethanol. The mixture was heated at the boiling point and refluxed for 26 hours. The mixture was distilled in vacuo and the product collected as an oil boiling at 150° C. at a pressure of 0.5 millimeter mercury. The 5,6-dihydro-4,6-dimethyl-2-(4-pyridyl)-4H-1,3,4-thiadiazine product was dissolved in anhydrous ether and treated with ethereal hydrogen chloride until precipitation of the hydrochloride product was complete. The precipitate was recrystallized by dissolving in methanol and adding ether, and the recrystallized 5,6 - dihydro - 4,6-dimethyl-2-(4-pyridyl)-4H-1,3,4-thiadiazine dihydrochloride product was found to melt at 227°–230° C. with decomposition.

EXAMPLE 8

5,6-dihydro-4,6-dimethyl-2-(2-pyridyl)-4H-1,3,4- thiadiazine hydrochloride 2-cyanopyridine (13.6 grams; 0.13 mole), 1-(1-methyl-hydrazino)-2-propanethiol (15.7 grams; 0.13 mole) and 100 milliliters of absolute ethanol were mixed together and refluxed for 16 hours. The ethanol was removed by distillation and the residue distilled rapidly in vacuo to give 20 grams of a yellow oil. The yellow oil was dissolved in 50 milliliters of ethanol, 50 milliliters of 10 N aqueous sodium hydroxide was added to the mixture and the resulting mixture was refluxed for 21 hours. The mixture was then poured onto crushed ice and extracted thoroughly with chloroform. The chloroform extract was washed with water, the washings discarded and the washed extract dried over magnesium sulfate. The chloroform was evaporated in vacuo and the oily residue was chromatographed on a 3 by 40 centimeter column containing 200 grams of alumina (Baker No. 0537). Eight 100 milliliter portions of benzene were used as an eluant. The product was collected from the eight elution fractions and the benzene evaporated off in vacuo. The residual oil was dissolved in dry ether and treated with ethereal hydrogen chloride until precipitation of the resulting yellow solid was complete. The precipitate was recrystallized from isopropyl ether and the 5,6-dihydro-4,6-dimethyl-2-(2-pyridyl)-4H-1,3,4-thiadiazine hydrochloride product was found to melt at 103°–104° C.

EXAMPLE 9

5,6-dihydro-4,6-dimethyl-2-(3-pyridyl)-4H-1,3,4,- thiadiazine hydrochloride 3-cyanopyridine (13.6 grams; 0.13 mole), 1-(1-methyl-hydrazino)-2-propanethiol (15.7 grams; 0.13 mole) and 250 milliliters of absolute ethanol were mixed together and refluxed for 24 hours under an atmosphere of dry nitrogen. The resulting mixture was concentrated in vacuo, cooled and dissolved in 50 milliliters of ethanol. The resulting solution was mixed with 50 milliliters of aqueous 10 N sodium hydroxide and the resulting mixture refluxed for 21 hours. The mixture was then cooled, poured onto crushed ice and extracted with chloroform. The chloroform extract was dried over magnesium sulfate and concentrated by evaporation in vacuo to leave an oily residue. The residue was chromatographed on a 3 by 30 centimeter column containing 150 grams of alumina (Baker No. 0537). One hundred milliliter portions of a 1:4 mixture of hexane and benzene were used as an eluant. The first four 100 milliliter fractions were evaporated in vacuo, leaving the product as a residue. The residue was then dissolved in dry ether and treated with ethereal hydrogen chloride until precipitation was complete. The 5,6-dihydro-4,6-dimethyl - 2-(3-pyridyl)-4H-1,3,4-thiadiazine hydrochloride product was recrystallized from a mixture of isopropanol, ethyl acetate and diethyl ether and found to melt at 168°–170° C. The hydrochloride product was found by analysis to have carbon, hydrogen, chlorine and nitrogen contents of 49.27, 6.05, 14.78 and 16.86 percent, respectively, as compared with the theoretical contents of 49.27, 5.78, 14.55 and 17.24 percent, respectively, calculated for the named structure.

EXAMPLE 10

5,6-dihydro-4,6,6-trimethyl-2-(4-pyridyl)-4H-1,3,4- thiadiazine maleate 2-methyl-2-(β-hydroxyisobutyl) isonicotinic acid hydrazide (19 grams; 0.085 mole), phosphorus pentasulfide (19 grams; 0.085 mole) and 150 milliliters of pyridine were mixed together and refluxed for four hours. The mixture was then concentrated by evaporation in vacuo and the residue dissolved in chloroform. The chloroform solution was washed with aqueous sodium hydroxide and water, the washings discarded, the washed solution dried over magnesium sulfate and the chloroform evaporated off in vacuo. The residue was chromatographed on a 3 by 27 centimeter column containing 150 grams of acid-washed alumina (Merck No. 71695). Methylene chloride was used as an eluant and the methylene chloride fractions were evaporated in vacuo to yield an oily residue. The oil was treated with an equivalent weight of maleic acid dissolved in a minimum of hot ethanol and a crystalline solid formed. The 5,6-dihydro-4,6,6-trimethyl-2-(4-pyridyl)-4H-1,3,4-thiadiazine maleate product was found to melt at 105°–110° C. with decomposition and to have carbon, hydrogen, nitrogen and sulfur contents of 52.85, 5.98, 12.09 and 9.41 percent, respectively, as compared with the theoretical contents of 53.40, 5.68, 12.46 and 9.50 percent, respectively, calculated for the named structure.

EXAMPLE 11

2-amino-5,6-dihydro-4,6-dimethyl-4H-1,3,4-thiadiazine

Cyanogen bromide (22 grams; 0.20 mole) was dissolved in 200 milliliters of water, and a solution of 1-(1-methylhydrazino)-2-propanethiol (24 grams; 0.20 mole) in 50 milliliters of water was added dropwise to the solution over a period of one hour. The resulting mixture was stirred at room temperature for 0.5 hour and thereafter stirred and refluxed for one hour. Charcoal was added to the hot mixture and the resulting mixture was filtered. The filtrate was cooled and made basic by the addition of sufficient aqueous sodium hydroxide to bring the pH to greater than 10. The basic solution was extracted with chloroform, the chloroform extract dried over magnesium sulfate and the chloroform solution distilled in vacuo. The 2-amino-5,6-dihydro-4,6-dimethyl-4H-1,3,4-thiadiazine product was collected as a liquid boiling at 78°–95° C. at a pressure of 0.10 millimeter mercury. The product was found by analysis to have carbon, hydrogen and nitrogen contents of 40.90, 8.28 and 28.40 percent, respectively, as compared with the theoretical contents of 41.35, 7.63 and 28.94 percent, respectively, calculated for the named structure.

2-amino-5,6-dihydro-4,6-dimethyl - 4H - 1,3,4 - thiadiazine oxalate, having a molecular weight of 235.3 is prepared by treating the above-described product with hot ethanolic oxalic acid.

EXAMPLE 12

3,4,5,6-tetrahydro-4,6-dimethyl-2-(3-pyridyl)-1,3,4-thiadiazine 3-pyridine carboxaldehyde (18 grams; 0.166 mole) was dissolved in 50 milliliters of ethanol, warmed to about 70° C. and added to a solution of 1-(1-methylhydrazino)-2-propanethiol (20 grams; 0.166 mole) and one milliliter of pyridine in 50 milliliters of ethanol heated to about 70° C. The resulting mixture was heated for about 30 minutes on a steam bath and thereafter concentrated by evaporation in vacuo. The residue was washed with diethyl ether and the mixture filtered. The filter cake was recrystallized twice from ethyl acetate and found to melt at 137°–138° C. The crystalline 3,4,5,6-tetrahydro-4,6-dimethyl-2-(3-pyridyl)-1,3,4 - thiadiazine product was found by analysis to have carbon, hydrogen and nitrogen contents of 57.55, 7.20 and 20.42 percent, respectively, as compared with the theoretical contents of 57.38, 7.22 and 20.07 percent, respectively, calculated for the named structure.

The novel thiadiazine compounds exhibit central nervous system activity as indicated by their effectiveness in prolonging hexobarbital sleep time in mice. In these determinations, the mice received a dosage of one of the thiadiazine compounds at a rate of from 10 to 400 milligrams per kilogram by either intraperitoneal injection or oral administration. Thirty minutes after the administration of the thiadiazine compound, the mice were administered hexobarbital at a dosage rate of 100 milligrams per kilogram by intraperitoneal injection. Untreated control mice were similarly injected with hexobarbital at a dosage rate of 100 milligrams per kilogram to serve as checks. The hexobarbital injections induced sleep in the mice. All the animals were then placed on their backs and the period of time until each mouse could spontaneously turn over and right itself was recorded as sleep time. The ratio of average sleep time for the treated mice to that for the untreated mice is expressed as hexobarbital sleep time ratio in the following table. All the test compounds were 5,6-dihydrothiadiazines unless otherwise indicated by an asterisk and the symbols are those defined with references to Formulas I, II and III.

| Substituent in 2-position | $R_1$ | $R_2$ | $m$ | HX | Dosage in milligrams/ kilogram | Hexobarbital sleep time ratio |
|---|---|---|---|---|---|---|
| Amino | $CH_3$ | H | 0 | | 400 i.p.[1] | 4 |
| 2-pyridyl | $CH_3$ | H | 0 | | 200 i.p. | 4 |
| 3-pyridyl | $CH_3$ | H | 1 | HCl | 200 i.p. | 2 |
| 3-pyridyl* | $CH_3$ | H | 0 | | 100 i.p. | 3 |
| 4-pyridyl | $CH_3$ | $CH_3$ | 1 | HCl | 25 oral | 5 |
| Do | $CH_3$ | H | 2 | HCl | 10 i.p. | 2 |

*3,4,5,6-tetrahydro-4,6-dimethyl-2-(3-pyridyl)-1,3,4-thiadiazine.
[1] i.p. = intraperitoneal injection.

In other operations, untreated mice were administered hexobarbital at a dosage rate of 100 milligrams per kilogram by intraperitoneal injection. The hexobarbital injections induced sleep in the mice, and the animals were then placed on their backs. When each mouse spontaneously turned over and righted itself, the mouse was then administered one of the thiadiazine compounds by intraperitoneal or oral routes. The mice were then placed on their backs and the number of mice failing to spontaneously turn over and right themselves was recorded. Loss of the righting reflex evidenced by such failure was expressed as re-sleep. From the dosage-response results obtained from these operations, the effective dosage (ED 50) of 5,6-dihydro-4,6,6-trimethyl-2-(4-pyridyl)-4H-1,3,4-thiadiazine hydrochloride for re-sleep was calculated to be 94 milligrams per kilogram for oral administration and 6.2 milligrams per kilogram for intraperitoneal injection. The effective dosage for re-sleep on administration of 5,6-dihydro-4,6-dimethyl-2-(4-pyridyl)-4H-1,3,4-thiadiazine dihydrochloride (ED 50) was calculated to be 33 milligrams per kilogram for oral administration and 9.4 milligrams per kilogram for intraperitoneal injection. In similar operations, mice similarly pretreated were examined for loss of the righting reflex after intraperitoneal injection of one of the thiadiazine compounds at various dosage rates. The percentage of the treated mice found to lose the righting reflex is expressed in the following table as percent of the treated mice undergoing re-sleep. All the test compounds were 5,6-dihydro thiadiazines unless otherwise indicated by an asterisk.

| Substituent in 2-position | $R_1$ | $R_2$ | $m$ | HX | Intra- peritoneal dosage in milligrams/ kilogram | Re-sleep (percent) |
|---|---|---|---|---|---|---|
| Amino | $CH_3$ | H | 0 | | 400 | 100 |
| 3-(1-pyrrol- idinyl)propyl | $CH_3$ | H | 0 | | 50 | 50 |
| 2-pyridyl | $CH_3$ | H | 0 | | 200 | 70 |
| 3-pyridyl* | $CH_3$ | H | 0 | | 100 | 70 |

*3,4,5,6-tetrahydro-4,6-dimethyl-2-(3-pyridyl)-1,3,4-thiadiazine.

We claim:
1. A substituted 1,3,4-thiadiazine compound corresponding to one of the formulae

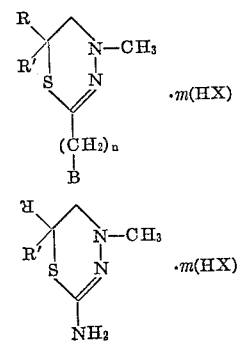

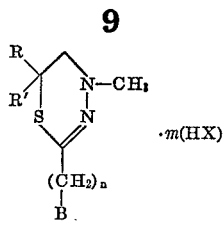 ·m(HX)

III wherein R and R' each independently represent a member of the group consisting of hydrogen and lower alkyl groups having from 1 to 4 carbon atoms, inclusive, B represents a cyclic amine group having from 4 to 5 carbon atoms, HX represents a member of the group consisting of hydrochloride, hybrobromide and physiologically-acceptable dicarboxylic acids having from 1 to 4 carbon atoms, inclusive, m represents an integer from 0 to 2, inclusive, and n represents an integer from 0 to 4, inclusive.

2. The compound claimed in claim 1 wherein the compound is 5,6-dihydro-4,6,6-trimethyl-2-(4-pyridyl)-4H-1,3,4-thiadiazine hydrochloride.

3. The compound claimed in claim 1 wherein the compound is 5,6-dihydro-4,6-dimethyl-2-(4-pyridyl)-4H-1,3,4-thiadiazine dihydrochloride.

4. The compound claimed in claim 1 wherein the compound is 3,4,5,6-tetrahydro-4,6-dimethyl-2-(3-pyridyl)-1,3,4-thiadiazine.

5. A method for making a 5,6-dihydro-1,3,4-thiadiazine compound comprising mixing together a hydrazinoalkylthiol corresponding to the formula

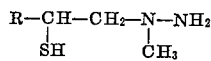

wherein R represents a member of the group consisting of hydrogen and lower alkyl groups having from 1 to 4 carbon atoms, inclusive, and a nitrile corresponding to the formula $$B-(CH_2)_n-C \equiv N$$

wherein B represents a cyclic amine group having from 4 to 5 carbon atoms, and n represents an integer from 0 to 4, inclusive, for a period of time sufficient to form the corresponding 5,6-dihydro-1,3,4-thiadiazine and separating the thus-formed thiadiazine.

6. The method of claim 5 wherein the alkylthiol and the nitrile are mixed in the presence of a solvent selected from the group consisting of methanol, ethanol, propanol, butanol and mixtures of two or more of the same.

7 The method of claim 6 wherein the reactants are mixed at the boiling temperature of the mixture.

8. The method of making a 5,6-dihydro-1,3,4-thiadiazine compound corresponding to the formula

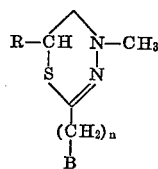

wherein R represents a member of the group consisting of hydrogen and lower alkyl groups having from 1 to 4 carbon atoms, and n represents an integer from 0 to 4, inclusive, B represents a cyclic amine group having from 4 to 5 carbon atoms, the method comprising mixing together a hydrazinoalkylthiol corresponding to the formula

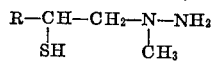

and a nitrile corresponding to the formula $$B-(CH_2)_n-C \equiv N$$

in the presence of an inert organic solvent selected from the group consisting of methanol, ethanol, propanol, butanol and mixtures of the same, removing the solvent by distillation under vacuum and heating the resulting residue in the presence of a solvent selected from the group consisting of methanol, ethanol, propanol, butanol and mixtures of the same, and an aqueous solution of an alkali metal hydroxide, and separating the thus-formed thiadiazine from the resulting mixture.

9. The method of claim 8 wherein R is methyl and B is 4-pyridyl.

10. The method of making a basically substituted 1,3,4-thiadiazine compound corresponding to the formula

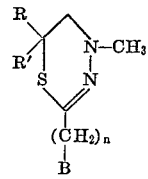

wherein R and R' each independently represent a member of the group consisting of hydrogen and lower alkyl groups having from 1 to 4 carbon atoms, inclusive, B represents a cyclic amine group having from 4 to 5 carbon atoms, and n represents an integer from zero to 4, inclusive, comprising mixing a β-hydrazinoalkylthiol corresponding to the formula

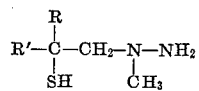

with an imido ester corresponding to the formula

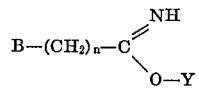

wherein Y represents a lower alkyl group having from 1 to 4 carbon atoms, inclusive, for a sufficient period of time to form the corresponding substituted thiadiazine, and separating the thus-formed thiadiazine.

11. The method claimed in claim 10 wherein the alkyl thiol and the imido ester are mixed in an inert organic solvent selected from the group consisting of methanol and ethanol.

12. The method of claim 11 wherein the imido ester and the alkylthiol are mixed at a temperature from about 20° to the boiling point of the mixture.

13. The method of claim 10 wherein the thiadiazine product is separated by extraction with a solvent selected from the group consisting of ether and chlorinated hydrocarbons.

14. The method of claim 13 wherein the thiadiazine product is separated from said extraction solvent by chromatography on a column containing alumina.

15. The method of claim 10 wherein R is methyl R' is methyl, B is 4-pyridyl, and n is zero.

16. The method of making a basically substituted 3,4,5,6-tetrahydro - 1,3,4 - thiadiazine compound comprising mixing together a β-hydrazinoalkylthiol corresponding to the formula

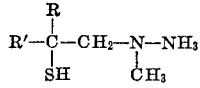

wherein R and R' each independently represent a member of the group consisting of hydrogen and lower alkyl groups having from 1 to 4 carbon atoms, inclusive, and an aldehyde corresponding to the formula

wherein B represents a cyclic amine group containing from 4 to 5 carbon atoms and n represents an integer from zero to 4, inclusive, in the presence of a small amount of pyridine for a period of time sufficient to form the corresponding substituted thiadiazine, and separating the thus-formed thiadiazine.

(References on following page)

References Cited

UNITED STATES PATENTS 3,290,303  12/1966  Trepanier ........... 260—243

OTHER REFERENCES

Beyer et al.: Chemische Berichte, vol. 87, pp. 223–7 (1954).

Grundmann: Chemische Berichte, vol. 82, pp. 227–9 (1949).

Traverso: Gazz. chim. ital., vol. 83, pp. 1027–30 (1963).

Trepanier et al.: J. Org. Chem., vol. 30, pp. 2228–34 (1965).

HENRY R. JILES, *Primary Examiner.*

J. M. FORD, *Assistant Examiner.*

U.S. Cl. X.R.

260—563; 424—246